United States Patent Office 3,316,067
Patented Apr. 25, 1967

3,316,067
METHOD FOR PREPARATION OF ALUMINUM HYDRIDE ADDITION COMPOUNDS
Neil R. Fetter, Arlington, Calif., and Bodo K. W. Bartocha, Indian Head, Md., assignors to the United States of America as represented by the Secretary of the Navy
No Drawing. Filed Apr. 3, 1962, Ser. No. 184,860
11 Claims. (Cl. 23—356)

The invention described herein may be manufactured and used by or for the Government of the United States of America for governmental purposes without the payment of any royalties thereon or therefor.

The present invention relates to the process for preparing aluminum hydride addition compounds from the reaction of aluminum hydride with hydrazine and substituted hydrazines.

It is therefore an object of the present invention to provide a simple method for preparing aluminum hydride addition compounds from the reaction of aluminum hydride with hydrazine and substituted hydrazines which may have use as rocket fuels and components for explosives.

Another object of this invention is to provide a process for preparing aluminum hydride addition compounds from the reaction of aluminum hydride with hydrazine and substituted hydrazines which have physical characteristics suitable for propellant additives.

In accordance with the present invention aluminum hydride addition compounds may be prepared by the reaction of aluminum hydride with hydrazine and lower alkyl hydrazines. The reaction is accomplished by preparing the aluminum hydride and adding it with a solution of hydrazine or a lower alkyl hydrazine in ether. During the addition of the aluminum hydride the reaction flask is kept cool and the product precipitates gradually. The solvent and any excess hydrazine are removed by vacuum. These products are stable at room temperature, but some must be handled with care as they are sensitive to friction and may explode violently.

The following examples serve to illustrate how the present invention may be carried out in practice; however, the invention is not restricted to the examples.

EXAMPLE I

*Aluminum hydride trimethylamine and 1,1-diethyl hydrazine*

25 ml. of heptane and 0.930 gram of 1,1-diethyl hydrazine were vacuum distilled into a 50 ml. flask containing 0.9195 gram of aluminum hydride trimethylamine [AlH$_3$:N(CH$_3$)$_3$] at −196° C. The mixture was allowed to warm to room temperature (approximately 25° C.) for 30 minutes and the product precipitated gradually from solution. After thawing, the solution is agitated from time to time but no other stirring is necessary. The reaction may be represented as:

AlH$_3$:N(CH$_3$)$_3$+H$_2$NN(C$_2$H$_5$)$_2$→
AlH$_2$NHN(C$_2$H$_5$)$_2$+N(CH$_3$)$_3$+H$_2$

Elemental analysis of the product gave the following:

Calculated: Al=23.23%; C=41.36%; H=11.28%; N=24.13%. Found: Al=23.56%; C=42.06%; H=10.72%; N=24.06%.

EXAMPLE II

*Aluminum hydride trimethylamine and 1,1-dimethylhydrazine*

25 ml. of heptane and 0.930 gram of 1,1-dimethylhydrazine were vacuum distilled into a 50 ml. flask containing 0.9195 gram of aluminum hydride trimethyl-amine at −196° C. The mixture was allowed to warm to room temperature (approximately 25° C.) and the product precipitated gradually from solution. After thawing the solution is agitated from time to time but no other stirring is necessary. The solvent and any excess hydrazine are removed by vacuum, and a powdery white solid was obtained. The reaction may be represented as follows:

AlH$_3$:N(CH$_3$)$_3$+H$_2$NN(CH$_3$)$_2$→
AlH$_2$NHN(CH$_3$)$_2$+H$_2$+N(CH$_3$)$_3$

Elemental analysis of the product gave the following:

Calculated: Al=22.98%; C=35.42%; H=9.57%; N=32.70%. Found: Al=22.57%; C=34.71%; H=9.66%; N=33.70%.

EXAMPLE III

*Aluminum hydride trimethylamine and 1,1-dimethyl hydrazine*

In this reaction 1,1-dimethyl hydrazine is also the solvent. By vacuum distillation 9.975 grams of 1,1-dimethyl hydrazine was transferred into a 50 ml. flask containing 0.5178 gram of aluminum hydride trimethylamine

[AlH$_3$:N(CH$_3$)$_3$]

at −198° C. After the distillation was complete, the mixture was allowed to warm to room temperature (about 25° C.) for 30 minutes. After gas evolution ceased, the excess hydrazine was removed by vacuum leaving a white powdery solid. This material melts with decomposition at about 200° C. The reaction may be represented as:

AlH$_3$:N(CH$_3$)$_3$+H$_2$NN(CH$_3$)$_2$→
C$_4$H$_{15}$N$_5$Al+N(CH$_3$)$_3$+H$_2$

An aluminum assay of the final product gave the following results:

Calculated: Al=16.84; C=29.99%; H=9.44%; N=43.73%. Found: Al=16.62%; C=30.16%; H=9.43%; N=43.90%.

EXAMPLE IV

*Aluminum hydride trimethylamine and methyl hydrazine*

Using the procedure as set forth in Example I above, monomethyl hydrazine may be substituted for 1,1-diethyl hydrazine. The reactoin may be written as follows, wherein n refers to repeating units of the molecule:

$$nAlH_3:N(CH_3)_3 + 2nH_2NNHCH_3 \longrightarrow$$

$$\left[\begin{array}{c} NH.NHCH_3 \\ | \\ -Al-NHNCH_3- \end{array}\right]_n + nN(CH_3)_3 + 3nH_2$$

A white powdery solid is obtained. Elemental analysis of the material obtained from the above procedure gave the following results:

Calculated: Al=23.56%; C=20.71%; H=7.82%; N=48.30%. Found: Al=25.01%; C=18.39%; H=5.89%; N=40.30%.

This compound is sensitive to shock and friction.

EXAMPLE V

Using the same procedure as outline in Example III hereinbefore described, monomethyl hydrazine may be substituted for 1,1-dimethyl hydrazine. A white powdery solid is obtained. The reaction may be represented as follows, wherein $n$ refers to repeating units of the molecule:

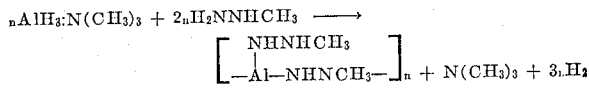

In this reaction monomethyl hydrazine is used as a solvent.

EXAMPLE VI

*Aluminum hydride trimethylamine and hydrazine*

By means of vacuum distillation 25 ml. of dry n-octane and 0.534 gram of hydrazine are transferred into a 50 ml. flask containing 0.3802 gram of aluminum hydride trimethylamine, $AlH_3:N(CH_3)_3$ at $-196°$ C. The mixture is allowed to warm to room temperature with stirring and, after an hour, a slightly yellow precipitate has formed. The solvent and excess hydrazine are removed by vacuum leaving a powdery solid. This material is stable at room temperature, but must be handled with care because it is sensitive to friction and may explode violently. An aluminum assay of the product gave the following results for the compound

wherein $n$ refers to repeating units of the molecule:

Calculated: Al=37.46%. Found: Al=35.00%.

The reaction may be written as:

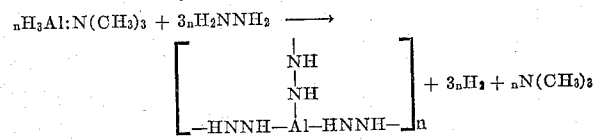

EXAMPLE VII

*Aluminum hydride trimethylamine and trimethylhydrazine*

By means of vacuum transfer 1.58 grams of trimethylhydrazine was placed on 1.81 grams of aluminum hydride trimethylamine, $H_3Al:N(CH_3)_3$ at $-196°$ C. Over a period of 30 minutes the mixture was warmed to 25° C. and then heated at 70° C. for two hours. The mixture was then vacuum sublimed at 60° C. (0.005 mm. Hg). The product was $H_2Al—N(CH_3)_2$; elemental analysis:

Calculated: C=32.87%; H=10.03%; N=19.17%; Al=36.92%. Found: C=32.72%; H=10.82%; N=19.70%; Al=36.55%.

The reaction may be represented as follows:

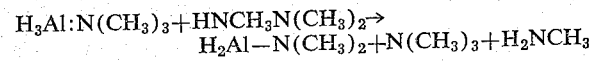

Various modifications are contemplated and may obviously be resorted to by those skilled in the art without departing from the spirit and scope of the invention as set forth in the appended claims.

What is claimed is:

1. A process for the preparation of aluminum hydride addition compounds from the reaction of a member selected from the group consisting of aluminum hydride etherate and aluminum hydride trimethylamine with a member selected from the group consisting of trimethylhydrazine, 1,1-diethylhydrazine, 1,1-dimethylhydrazine, monomethylhydrazine and hydrazine at a reaction temperature of about $-196°$ C., warming to a temperature of about 25° C. and stirring until a precipitate forms.

2. A process for the preparation of an aluminum addition compound of aluminum hydride trimethylamine and 1,1-diethylhydrazine comprising adding aluminum hydride trimethylamine to 1,1-diethylhydrazine at a reaction temperature of $-196°$ C., warming to 25° C. and agitating until a white precipitate forms.

3. The compositoin having the formula

4. A process for the preparation of an aluminum addition compound of aluminum hydride trimethylamine and 1,1-dimethylhydrazine comprising adding aluminum hydride trimethylamine to 1,1-dimethylhydrazine at a reaction temperature of $-196°$ C., warming to 25° C., and agitating until a white precipitate forms.

5. The composition having the formula

6. A process for the preparation of an aluminum addition compound of aluminum hydride trimethylamine and monomethylhydrazine comprising adding aluminum hydride trimethylamine to monomethylhydrazine at a reaction temperature of $-196°$ C., warming to 25° C. whereby a white solid is obtained.

7. The composition having the formula

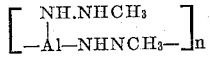

wherein $n$ refers to repeating units of the molecule.

8. A process for the preparation of an aluminum addition compound of aluminum hydride trimethylamine and hydrazine comprising adding aluminum hydride trimethylamine to hydrazine at a reaction temperature of $-196°$ C., warming to room temperature and stirring until a slightly yellow precipitate forms.

9. The composition having the formula

wherein $n$ refers to repeating units of the molecule.

10. A process for the preparation of an aluminum addition compound of aluminum hydride trimethylamine and trimethylhydrazine comprising reacting trimethylhydrazine and aluminum hydride trimethylamine at $-196°$ C. for about 30 minutes, warming to 25° C., then heating to 70° C. for two hours.

11. The composition having the formula

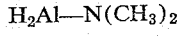

References Cited by the Examiner

UNITED STATES PATENTS 3,072,698   1/1963   Hinckley _____ 260—448

OTHER REFERENCES

Ruff et al., Journal of American Chemical Society, volume 82, No. 9, pages 2141–2144 (May 5, 1960).

OSCAR R. VERTIZ, *Primary Examiner.*

LEON D. ROSDOL, *Examiner.*

J. W. WHISLER, H. S. MILLER, *Assistant Examiner.*